United States Patent [19]

Lynn

[11] Patent Number: 4,976,935
[45] Date of Patent: Dec. 11, 1990

[54] REGENERATION OF SOLVENT IN $H_2S$ REMOVAL FROM GASES

[75] Inventor: Scott Lynn, Walnut Creek, Calif.

[73] Assignee: Regents of the University of California, Berkeley, Calif.

[21] Appl. No.: 210,750

[22] Filed: Jun. 15, 1988

Related U.S. Application Data

[63] Continuation-in-part of Ser. No. 657,809, Nov. 4, 1984, abandoned.

[51] Int. Cl.$^5$ .................. C01B 17/16; C01B 31/20; C01B 17/02
[52] U.S. Cl. ........................ 423/222; 55/48; 55/53; 423/226; 423/574 R; 423/574 L; 423/575; 423/576.4
[58] Field of Search ............... 55/53, 48; 423/576.4, 423/222, 574 L, 574 R, 575

[56] References Cited

U.S. PATENT DOCUMENTS

| | | | |
|---|---|---|---|
| 3,103,411 | 9/1963 | Fuchs | 423/222 |
| 3,363,989 | 1/1968 | Deal et al. | 423/575 |
| 3,875,295 | 4/1975 | Barthel et al. | 423/575 |
| 3,953,586 | 4/1976 | Tanimura | 423/575 |

Primary Examiner—John Doll
Assistant Examiner—Lori F. Cuomo
Attorney, Agent, or Firm—Flehr, Hohbach, Test, Albritton & Herbert

[57] ABSTRACT

A process of removing hydrogen sulfide from a gas stream in which the hydrogen sulfide is dissolved in an absorption zone by a solvent having a good solvent power for hydrogen sulfide and a much greater solvent power for sulfur dioxide. The resultant solution is divided into a major stream and a minor stream. The major stream is contacted with a small excess of sulfur dioxide over that required for reaction with hydrogen sulfide. Most of this solution is recycled to the absorption zone. The minor stream withdrawn from the absorption zone is mixed with the solution formed in the reaction zone which is not recycled, the proportion being such that there remains a small excess of hydrogen sulfide in solution. This solution is then stripped of hydrogen sulfide. By this means only a small fraction of the solution has to be stripped. Preferred solvents are those which promote the reaction of hydrogen sulfide with sulfur dioxide.

9 Claims, 3 Drawing Sheets

REGENERATION OF SOLVENT IN H₂S REMOVAL FROM GASES

This application is a continuation-in-part of co-pending application Ser. No. 657,809, filed Nov. 4, 1984, entitled "PROCESS ,FOR REMOVAL OF HYDROGEN SULFIDE FROM GASES" now abandoned.

This invention relates to the removal of hydrogen sulfide from gases such as refinery gases resulting from cracking processes intended to convert organic sulfur compounds to hydrogen sulfide, from natural gas, from gases derived from coal, etc.

BACKGROUND OF THE INVENTION

Hydrogen sulfide is a contaminant that is frequently encountered in industrial gas streams of commercial importance. Examples include many sources of natural gas, refinery gases produced from hydrodesulfurization processes, and most coal-derived gas streams. The hydrogen sulfide must generally be reduced to a rather low level, frequently 4 parts per million (ppm) or less, before the gas stream may be used as a fuel or a synthesis gas or be discharged to the atmosphere. Processes for removing hydrogen sulfide from gas streams (called sweetening) are generally both capital- and energy-intensive.

Figure 1:
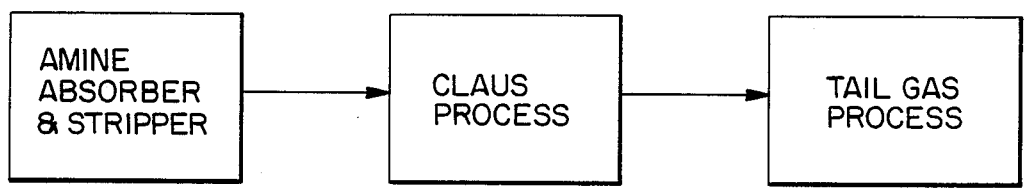
FIG. 1 is a block diagram of the conventional technology for sweetening gases.

The hydrogen sulfide leaving the stripper enters the Claus plant where one-third of it is burned with air to form sulfur dioxide, which is then caused to react with the remaining hydrogen sulfide to form sulfur and water according to Reaction 1:

$$2 H_2S + SO_2 \rightleftharpoons 3/x S_x + 2 H_2 \tag{1}$$

In the Claus plant, Reaction 1 occurs in the gas phase at a temperature above the point at which sulfur condenses, typically about 200° C. At such temperature the reaction is equilibrium-limited and does not go to completion, even when two or three reaction stages, with sulfur condensers in between, are employed The gas leaving the Claus plant typically contains 2,000 to 6,000 ppm of unreacted hydrogen sulfide and sulfur dioxide and must be treated in a tail gas unit to remove these pollutants before being released to the atmosphere The capital investment required for a tail gas unit is about equal to that for the Claus plant, and the energy required for its operation is also substantial.

If Reaction 1 is carried out in an organic solvent, at a temperature below the melting point of sulfur, the reaction becomes irreversible and has no equilibrium limitation. Deal, et al. U.S. Pat. No. 3,363,989, Tanimura U.S. Pat. No. 3,953,586, Townsend U.S Pat. No. 2,881,047 and Urban, et al. U.S. Pat. No. 2,998,304 propose processes that depend upon such a liquid-phase reaction. Each of their processes absorbs the hydrogen sulfide in an organic solvent as the first step, and depends on the physical solubility of the hydrogen sulfide in the solvent to accomplish the absorption. A second step in each of the processes is to carry out Reaction 1 in the liquid phase. Since the water formed in Reaction 1 is dissolved in the solvent, it must be removed to maintain the water balance of the system. Each of the processes proposed in the references above includes passing the entire liquid stream from the hydrogen-sulfide absorber through a stripper as part of the regeneration that occurs before the solvent is recycled to the absorber Each of the processes depends upon this stripping step to remove unreacted H₂S or SO₂ as well as water from the liquid stream. The boil-up employed for this step determines the minimum concentration of H₂S (or SO₂) that will remain in the treated gas, as noted above.

SUMMARY OF THE INVENTION

It is an object of the present invention to provide a process for removal of hydrogen sulfide from gases which is an improvement upon those processes known heretofore.

It is a particular object of the invention to provide such a process which accomplishes desired reduction in the hydrogen sulfide content of an industrial gas and in gases separated from the industrial gas and vented to the atmosphere but which avoids the need to strip a large volume of liquid used as the absorbent for hydrogen sulfide.

It is another object to provide such an energy saving process which also enables one to recover other minor ingredients of the gas such as carbon dioxide and/or lower hydrocarbons.

In accordance with the invention a "sour" gas, e.g. an industrial gas such as described above which contains hydrogen sulfide, is contacted with an absorbent to absorb the hydrogen sulfide and produce an effluent gas containing no more than the desired amount of hydrogen sulfide, e.g. a few parts per million; the resulting solution containing hydrogen sulfide dissolved in the solvent is divided into a major portion and a minor portion; the major portion is contacted with sulfur dioxide dissolved in the same solvent, such being used in slight excess to react with the hydrogen sulfide in accordance with Reaction (1) leaving a small excess of sulfur dioxide dissolved in the solvent; the greater part of the resulting solution is recycled, together with lean solvent, to the absorber; and the minor portion of solution withdrawn from the absorber is mixed with the remainder of the aforesaid solution in proportions such that there is a small excess of hydrogen sulfide left after Reaction (1). Sulfur formed by such treatment of the major and minor portions of the solution withdrawn from the absorber is removed and the solvent is separated and stripped of hydrogen sulfide.

In a variant, the process is so conducted as to recover minor components of the sour gas such as $CO_2$ and/or lower hydrocarbons.

DETAILED DESCRIPTION OF THE INVENTION

Figure 2:
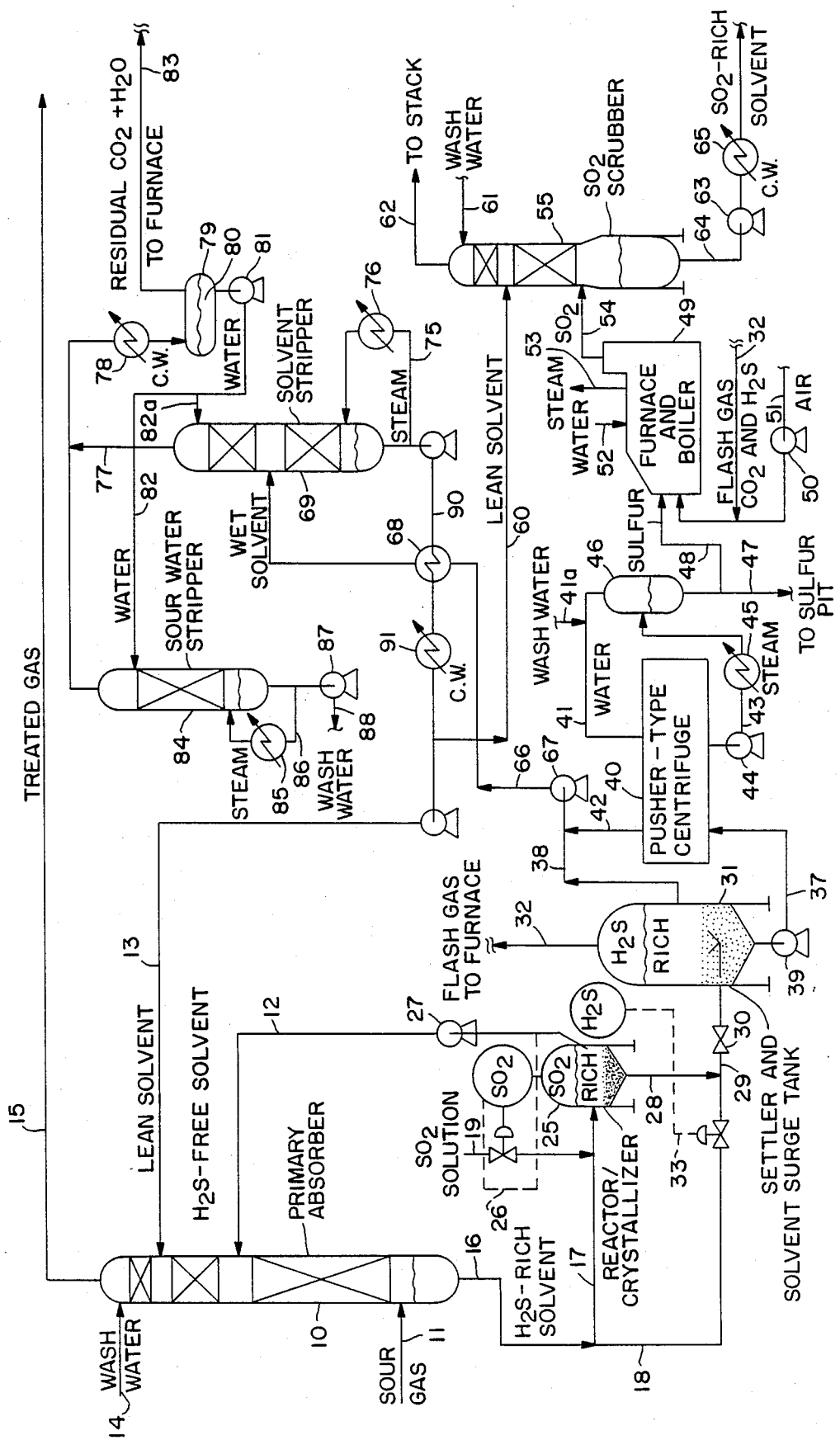
FIG. 2 is a flow sheet illustrating the separation of hydrogen sulfide from a gas in which that is the only component one wishes to remove.

Referring now to FIG. 2 a sour gas containing, for example, 0.1 to 10.0 percent of hydrogen sulfide enters absorber 10 through line 11. Absorber 10 and other units in FIG. 2 (and also in FIG. 3) are of well known construction. The absorber 10, for example, is provided with trays and/or other equipment to promote contact between an upwardly moving gas phase and a downwardly moving liquid phase. Solvent is introduced through lines 12 and 13 and wash water through line 14. Sweetened gas substantially free of hydrogen sulfide, for example, containing only a few parts per million or less of hydrogen sulfide leaves absorber 10 through line 15 for suitable use, for example, as a fuel or as a chemical feed stock.

The solvent is selected according to criteria which are described below. It absorbs the hydrogen sulfide in the sour gas and a solution of hydrogen sulfide in the solvent leaves absorber 10 through line 16. The flow of solution is divided, the major proportion, typically about 80 to 90 percent, passes through line 17 and a minor portion, typically about 10 to 20 percent passes through line 18.

It will be understood that a proportioning valve (not shown) will be used to divide the flow as desired or as needed.

The major proportion, passing through line 17, is recycled to the absorber 10 after being chemically regenerated in reactor 25 while the minor proportion, passing through line 18, passes into the remainder of the system including a solvent stripper. It will therefore be apparent that only a minor proportion of the solvent is stripped by physical means of absorbed gases.

Sulfur dioxide dissolved in the selected solvent enters through line 19 and joins the solution of hydrogen sulfide in line 17. The combined streams then pass through line 20 to a reactor 25 which also functions as a crystallizer to crystallize solid sulfur.

The reactor 25 preferably operates at the pressure of absorber 10 which is typically about 100 to 500 psi at a temperature of about 20° to 40° C. The combined stream entering reactor 25 is metered to keep the $SO_2$ content within the reactor a few percent, for example 2 percent above stoichiometric relative to the $H_2S$. There is a slight excess of $SO_2$ in reactor 25 over and above that required by reaction (1). The equipment within the square 26 is a detector which senses the sulfur dioxide concentration in reactor 25 and maintains the desired small excess. Such detection/control equipment is well known in the art, and it is needed because, among other things, the concentration of $H_2S$ in the sour gas in line 11 and/or the rate of flow of sour gas may vary with time.

The excess of $SO_2$ in reactor 25 serves to drive reaction (1) to completion within an extremely short span of time at the prevailing temperature, e g. about 20° to 40° C. at a pressure of about 100 to 500 psi.

Clarified overflow, consisting of solvent, a small amount of $SO_2$ and water produced by reaction (1) and nearly saturated with the other components of the out gas streams is pumped by pump 27 through line 12 to absorber 10.

At this point it should be mentioned that lean solvent, i.e. solvent containing no $SO_2$ or $H_2S$, and which is produced as described below enters absorber 10 through line 13 and water through line 14. The solvent entering through line 12 contains a small amount of $SO_2$ which reacts with and therefore removes small traces of H2S that fail to dissolve in the solvent in absorber 10, and lean solvent entering through line 13 absorbs any remaining trace of $SO_2$ that may be stripped from the solvent entering through line 12. Wash water entering absorber 10 through line 14 serves to absorb solvent vapor which evaporates from the solvent entering through lines 12 and 13. Thus the gas leaving through line 15 has only a trace, for example, 1 to 10 parts per million (ppm) of solvent vapor and $SO_2$ and it may be used as a fuel, as a chemical feed stock or otherwise without contaminating the gas ultimately discharged to the atmosphere.

Typical conditions in absorber 10 are a temperature of about 30° to 50° C. and a pressure of about 100 to 500 psi. At this temperature, although some sulfur is formed in a-sorber 10 through reaction of $H_2S$ with $SO_2$, the sulfur does not precipitate but remains in solution.

The underflow from reactor 25, which consists primarily of solvent, sulfur and water, leaves through line 28 and joins the small volume of solvent containing dissolved $H_2S$ in line 18. The combined flow passes through line 29 and valve 30 to a settler and solvent surge tank 31.

The flow though line 28 is sized to keep the water content of the solvent from exceeding about 5 percent of the volume of solvent and is directly proportional to the rate of $H_2S$ removal from the feed gas in absorber 10. The flow in line 28 will typically be about 10 to 20 percent of the flow of solvent through line 16. Sufficient $H_2S$-rich solvent, typically about 1 to 2 percent of the flow in line 17, is combined through line 18 with the stream in line 28 to leave a small excess of $H_2S$, for example about 5 percent, after the residual $SO_2$ has reacted in accordance with reaction (1) in line 29 and in settler/surge tank 31.

This stream, containing a small amount of $H_2S$, is flashed to atmospheric pressure in settler/surge tank 31. The off-gas from this flashing can be recompressed and returned to the inlet of primary absorber 10, but if the off-gas is of little value it leaves through line 32 and is introduced into the sulfur furnace described hereinbelow.

A detector/control device 33 is indicated to control flow of $H_2S$ solution to line 18 to maintain the desired $H_2S$ excess in settler/surge tank 31.

Exothermic reaction occurs in reactor 25 and settler/surge tank 31 which may be cooled by suitable cooling means well known in the art.

Apart from the gas removed through line 32 two streams flow from settler/surge tank 31. One stream is a slurry which is an underflow through line 37 and the other is an overflow through line 38.

The underflow contains the sulfur resulting from reaction (1), mostly in reactor 25 but some in absorber 10 and some in settler/surge tank 31. This slurry flow, aided by pump 39, passes into a pusher-type centrifuge 40. Sulfur is filtered out and washed with water entering through line 41. Overflow from centrifuge 40 passes through line 42 and joins the stream in line 38. The sulfur leaves centrifuge 40 through line 43 aided by pump 44 and heated by heat exchanger 45. The sulfur may be separated from concomitant water by heating to melt it, forming a liquid phase which is immiscible with water, then separating the molten sulfur, such being done in tank 46. This provides water for line 41. Make up water as needed is added through line 41a. Part of the sulfur passes through line 47 to storage and part (about one-third) is diverted through line 48 to furnace 49 into which air is pumped by blower 50 through line 51. Line 32 carrying off-gas from settler/surge tank 31 and solvent stripper 69 is shown entering line 51 (see above).

Unless the hydrogen sulfide content of the feed gas is too low, the heat generated in furnace 49 by reaction (2)

$$S + O_2 \rightarrow SO_2 \quad (2)$$

is sufficient to generate most or all of the energy input required in the process. A water inlet is shown at 52 and a steam outlet at 53, steam being generated in a boiler which is indicated as part of the furnace 49.

An excess of sulfur over that required for reaction (2) is supplied to the furnace to avoid production of $SO_3$. Excess sulfur is condensed in an economizer (not shown) and is recycled to the furnace.

$SO_2$ from furnace 49 passes through line 54 to sulfur dioxide scrubber/absorber 55. Lean solvent generated as described below enters scrubber 55 through line 60 and wash water enters through line 61. The solvent (see below) is selected to have a very high solvent power for $SO_2$ so that it, together with the wash water dissolves all but a trace (for example 1 to 10 ppm) of $SO_2$. $SO_2$-free gas is vented through line 62. $SO_2$-rich solvent is pumped by pump 63 through line 64, thence to line 19 and reactor 25. The $SO_2$-rich solvent in line 64 is cooled by cold water in heat exchanger 65.

Returning now to the overflow from settler/surge tank 31 and centrifuge 40 through lines 38 and 42, respectively, these streams join in line 66 and are pumped by pump 67 through heat exchanger 68 for heating to solvent stripper 69. This stream consists of wet solvent and the purpose of stripper 69 is to rid the solvent of water and absorbed gases.

Stripper 69 is provided with a reboiler consisting of line 75 and heat exchanger 76 using steam as a source of heat. Water together with co-absorbed gas (such as $CO_2$ and any unreacted $H_2S$) pass through line 77 and cooler/condenser 78 to vessel 79 in which water separates at 80 and is removed by pump 81 through line 82, a portion passing through line 82a to stripper 69 as reflux. Off-gases (for example $CO_2$ and $H_2S$) and water vapor leave vessel 79 through line 83 and are introduced into furnace 49 through line 32 along with gas from settler/surge tank 31.

"Sour" water (containing a small amount of $H_2S$) in line 82 passes into stripper 84 which is supplied with heat by heat exchanger 85 and line 86. The $H_2S$ content of the sour water is stripped from it and is returned to condenser 78 through line 77a. The remainder of the underflow is pumped by pump 87 to line 88, providing wash water for the system.

$SO_2$-free solvent leaving solvent stripper 69 passes through line 90 via heat exchangers 68 and 91, part being returned via line 13 to $H_2S$ absorber 10 and part to line 60 and the $SO_2$ absorber 55.

Figure 3:
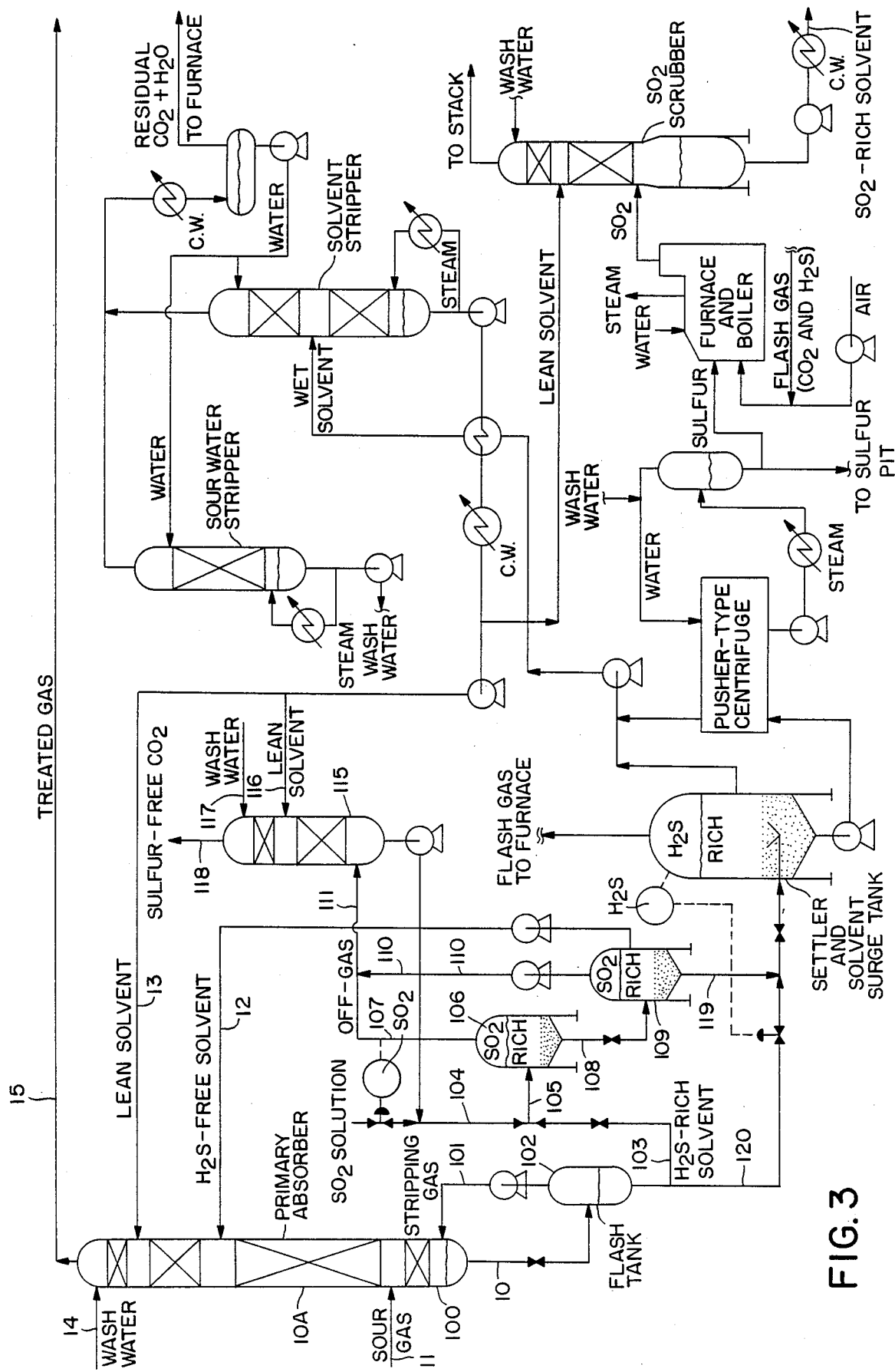
FIG. 3 is a flow sheet illustrating the separation of another volatile gas such as carbon A block diagram of the conventional technology for sweetening gases is shown in FIG. 1. In the absorber/stripper operation the hydrogen sulfide is first absorbed from the gas with a basic aqueous solution that contains an ethanol amine or potassium carbonate as the absorbant. The absorbant solution is regenerated by stripping the hydrogen sulfide from the liquid by boiling. The fraction of the stream that is converted to vapor is called the "boil-up." Most of the water vapor leaving the top of the stripper is condensed and returned to the top of the stripper as reflux to prevent loss of volatile absorbant and to keep the water content of the absorbant solution constant. The greater the boil-up the lower the concentration of hydrogen sulfide that remains in the stripped solution, and the lower that concentration the lower the concentration of hydrogen sulfide that can be achieved in the treated gas leaving the absorber. All of the liquid stream leaving the absorber must pass through the stripper The energy required to operate the stripper is therefore quite high and increases with the stringency required for hydrogen sulfide removal. If carbon dioxide and many other gases (such as propane and higher hydrocarbons) are present in the gas to be sweetened they are co-absorbed to some extent (depending on the specific absorbant solution) even when their removal is not desired. The co-absorption of other gases with the hydrogen sulfide increases the energy required for the stripper and may interfere with the subsequent steps in the process.

Referring now to FIG. 3, absorber 10A functions substantially like absorber 10 of FIG. 2 with sour gas feed line 11, solvent recycle line 12, lean solvent line 13, wash water line 14, treated gas line 15 and $SO_2$-rich solvent line 16 functioning like similarly numbered lines in FIG. 2. The sour gas (feed gas) is, by way of example, a synthesis gas from a shift reactor in which reaction (3) has been carried out.

$$CO + H_2O \rightleftharpoons CO_2 + H_2 \quad (3)$$

Such gas may contain $H_2S$. At the bottom of absorber 10A is a short section 100 in which much of the $H_2$ and CO are stripped from the solvent. The stripping gas entering through line 101 is obtained by compressing the gas evolved in a partial flash of the solvent in flash tank 102, immediately downstream of absorber 10A. Most of the $H_2S$-rich solvent stream leaves flash drum 102 through line 103 and, together with a controlled flow of $SO_2$ solution from line 104, flows through line 105 into an $SO_2$-rich reactor 106. Reactor 106 operates at a pressure below that of flash tank 102 but above atmospheric pressure. Reactor 106 thus also serves as a flash tank, releasing dissolved $CO_2$ and a small amount of unreacted $SO_2$ through line 107.

The underflow leaving reactor 106 through line 108 is flashed to about one atmosphere as it enters tank 109. The off-gas leaving tank 109 through line 110 is compressed to the pressure desired for the $CO_2$ product and is combined with the off-gas from reactor 106 in line 111 to enter scrubber 115. (As will be apparent to those skilled in the art, one or more flash tanks operated at pressures intermediate between reactor 106 and tank 109 could be employed to reduce the energy required for gas compression.) In scrubber 115 the gas is contacted with a small amount of lean solvent from line 116 to remove traces of $SO_2$, then washed with water from line 117 to recover solvent vapor before exiting as a sulfur-free product stream through line 118. For the case shown, in which a high degree of $CO_2$ removal is not required, clarified $H_2S$-free solvent from tank 109 which has been chemically regenerated to remove that gas (but not water) can be pumped through line 12 directly back to absorber 10A. For a case in which the co-absorbed gas is of more value than $CO_2$, a stripping step would be required in line 12 between tank 109 and absorber 10A. Solvent containing a small amount of $SO_2$ leaves the bottom of scrubber 115 and is pumped by pump 125 through line 126 into line 104.

The net sulfur and water formed by Reaction 1 in reactor 106 are conveyed in the underflow from tank 109 through line 119. This stream is rendered $H_2S$-rich with by-passed $H_2S$ solution metered through line 120 as it enters reactor/settler/surge tank 31. As before, the flow of this stream is proportional to the rate of sulfur production. Tank 31 in FIG. 3 serves the same function as tank 31 in FIG. 2, and the equipment downstream of these two tanks is identical in function and operation.

In FIG. 3 various items of equipment are shown such as pumps, compressors and detector/control devices whose function will be apparent from the description of FIG. 2.

The Solvent

The solvent used to absorb H$_2$S in absorber 10 and 10A and to absorb So$_2$ is selected according to the following criteria: The solvent should be unreactive with the substances which it contacts, i.e. the components of the feed gas, water, SO$_2$ and the materials of construction. Preferably it should be a very good solvent for SO$_2$ and have a good but lesser solvent power for H$_2$S. It should also have a low volatility, boiling at atmospheric pressure at about 180° C. or above. However, lower boiling solvents may be used such as methanol, ethanol, propanol and the butanols.

The preferred solvents are polyglycol ethers such as those of Table 1 which sets forth the solubilities for SO$_2$, H$_2$S and other gases in the respective solvents.

TABLE 1

SOLUBILITY OF GASES IN ORGANIC SOLVENTS
(AT INFINITE DILUTION)

| | [gmoles gas/kg solvent]/MPa @ 25° C. | | | | |
|---|---|---|---|---|---|
| | GAS | | | | |
| SOLVENT | SO$_2$ | H$_2$S | CO$_2$ | C$_3$ | n-C$_4$ |
| Diglyme | 383 | 11.74 | 2.03 | 3.46 | 10.36 |
| Triglyme | 293 | 10.93 | 1.65 | 2.58 | 7.72 |
| Tetraglyme | 265 | 10.65 | 1.50 | 2.10 | 6.22 |
| Dowanol DM | 267 | 9.87 | 1.29 | 1.45 | 3.93 |
| Dowanol TBH | | 7.15 | 1.17 | 2.17 | 6.37 |

Note:
C$_3$ = Propane
n-C$_4$ = n-Butane
Diglyme = Diethylene glycol dimethyl ether
Triglyme = Triethylene glycol dimethyl ether
Tetraglyme = Tetraethylene glycol dimethyl ether
Dowanol DM = Diethylene glycol methyl ether
Dowanol TBH = Diethylene glycol tert-butyl ether The term MPa is megapascals.

Further considerations regarding the solvent are as follows:

The solvating power of the solvent for the major constituents of the gas, for example methane in the case of natural gas, should of course be quite low. Further, the solvent should promote Reaction (1) and it should not form strong chemical complexes with sulfur dioxide or with constituents of the feed gas. Where it is desired to remove water from the feed gas a more polar solvent is indicated. The solvent should have at least moderate miscibility with water and should be a moderately good solvent for sulfur, for example, capable of dissolving at 25° C. one gram per liter or more.

Where it is desired to absorb propane or other higher hydrocarbons the solvent may be modified by including a less polar component. Solvent mixtures (i.e., "mixtures" in the sense of two or more liquid components which are in solution as a homogeneous phase) may be employed to advantage to achieve such objectives.

To minimize loss of volatile solvent components in the gas streams being treated it is desirable to use components of low volatility. In most cases liquid with normal boiling points greater than 180° C. are preferred.

Below is a list of solvent components by category. Such solvents may be employed individually or in combination of two or more solvents.

(1) Solvent components which have very high solvating power for SO$_2$

Dialkyl ethers of polyethylene glycols such as triethylene glycol dimethyl ether, tetraethylene glycol diethyl ether, etc.

Dialkyl ethers of polypropylene glycols such as tripropylene glycol dimethyl ether, tetrapropylene glycol diethyl ether, etc.

Monoalkyl ethers of polyethylene glycols such as diethylene glycol monomethyl ether, triethylene glycol monoethyl ether, etc.

Monoalkyl ethers of polypropylene glycols such as dipropylene glycol monomethyl ether, tripropylene glycol monomethyl ether.

These glycol ethers have the general formula R$_1$O—[—R—O—]—$_n$R$_2$ where R is —CH$_2$—CH$_2$— or —CH$_2$—CH(CH$_2$)—, n represents the number of alkylene oxide units, e.g. 3 or 4, R$_1$ is alkyl (e.g. methyl or ethyl) and R$_2$ is hydrogen or alkyl.

Tertiary aromatic amines such as N,N-dimethyl aniline, N-phenyl diethanolamine, etc.

Trialkyl phosphates such as tributyl phosphate, tripropyl phosphate, etc.

Tetrahydrothiophene oxide (sulfolane).

(2) Solvents which are good catalysts for Reaction (1)

High boiling aromatic compounds containing nitrogen within a ring, such as quinoline, acrolein, the benzyl pyridines and similar compounds.

Dimethyl aniline.

bis-Methylene-4,4'-dimethylaminobenzene.

Trialkyl phosphates such as those in Section (1) above.

(3) Solvents which are good solvents for sulfur

N,N-Dimethyl aniline.

bis-Methylene-4,4'-dimethylaminobenzene.

Other tertiary aromatic amines such as N,N-diethyl aniline, quinoline and isoquinoline.

Further considerations in the choice of a solvent are as follows: Reaction (1) is a first order reaction with respect to each of the reactants. Therefore its rate is described by the following equation:

$$R = k_2[H_2S][SO_2]$$

in which
R = rate of disappearance of SO$_2$, moles/liter-sec.
k$_2$ = reaction rate constant, liter/mole-sec.
[] = concentration in moles/liter
and k$_2$ is assumed to be a function only of temperature. For use in the process of the present invention a solvent preferably has a value of k$_2$ at room temperature (25° C.) of at least 1.0 and preferably of 10 liter/mole-sec. or higher.

The kinetics of Reaction (1) was determined for a specific solvent composition by carrying out the reaction in the following way: A sample of solvent containing hydrogen sulfide was placed in a calorimeter, together with a thermocouple and a magnetic stirring bar. A sample of solvent containing sulfur dioxide was then added rapidly to the calorimeter while stirring vigorously. The temperature rise that resulted from reaction was followed by recording the potential of the thermocouple as a function of time during the experiment. The change in temperature was used to calculate the change in concentrations of both hydrogen sulfide and sulfur dioxide as the reaction progressed, and this information was used to calculate the value of $k_2$ in the equation above.

Experiments of this sort show that quinoline and similar aromatic ring-nitrogen compounds are exceptionally effective catalysts for Reaction (1) and are particularly advantageous in the practice of this invention. As an example, the value of $k_2$ was determined for mixtures of N,N-dimethyl aniline (DMA) and triethylene glycol dimethyl ether (Triglyme) at 25° C. as a function of composition. The values were about 1.0 at 1% DMA, 4.0 at 10% DMA, and 8.0 at 100% DMA. For a mixture of 1% quinoline in Triglyme the value of $k_2$ was about 20. In more concentrated solutions of quinoline in Triglyme the values of $k_2$ were too high to be estimated accurately by this technique. Because of their low volatility and the low concentrations at which they are effective catalysts, quinoline, substituted pyridines such as 4-benzy pyridine and 3-pyridyl carbinol, and similar compounds can be used in the practice of this invention at low cost and with little volatile loss. Their use is thus preferred to the use of DMA, as taught by Urban (U.S. Pat. No. 2,987,379), or the use of N-methyl-2-pyrrolidone as taught by Fuchs (U.S. Pat. No. 3,103,411) and Tanimura (U.S. Pat. No. 3,953,586).

A combination of solvents may be preferred, e.g. a mixture of a solvent from Section 1 above for high solvating power for sulfur dioxide and dimethyl aniline for its catalytic and sulfur solvating properties.

Catalysis of Reaction (1)

It is preferred that Reaction (1) be rapid. Reaction (1) is first-order with respect to both $H_2S$ and $SO_2$. This means that the rate of the reaction may be expressed by Equation 2:

$$Rate = k_2[H_2S][SO_2]$$

in which the square brackets indicate concentrations in moles per liter. If the reactors used in the process are to be excessively large the value of $k_2$ should exceed 1 liter/mole-second and preferably should exceed 10 liter/mole-second. The rate of Reaction 1 in many polyglycol ethers has been found to be relatively slow in absence of a catalyst. However, as is shown in Table 2, numerous tertiary nitrogen compounds make effective homogeneous catalysts for the reaction. Nitrogen-containing heterocyclic aromatic compounds have been found to be particularly effective.

TABLE 2

Rate Constants for Various Catalysts In Diethylene Glycol Methyl Ether

| CATALYST | $k_2$ |
| --- | --- |
| Non-Heterocyclics | (L/mol-s) |
| N,N-Dimethyl aniline (0.44 M) | 16.0 |
| N-Phenyl diethanol amine (0.44 M) | 0.71 |
| Triethyl amine (0.83 M) | 13.6 |
| Heterocyclics (All at 0.07 M) | |
| 2-Benzyl pyridine | 4.80 |
| 4-Benzyl pyridine | 8.33 |
| 4,4'-Bipyridine | 6.34 |
| 2-Phenyl pyridine | 0.72 |
| Pyridine | 8.40 |
| Quinoline | 2.80 |
| 3-Pyridyl carbinol | 6.41 |

Significance of Chemical Regeneration of the Solvent

In both FIGS. 2 and 3 the bulk of the solvent is treated with a small excess of $SO_2$ to convert the $H_2S$ to sulfur and water and the solvent, thus treated, is returned to absorber 10 or 10A.

Only a small proportion of the solvent (which contains a small amount of $H_2S$ and traces of unreacted $SO_2$) is subjected to stripping in solvent stripper 69 to remove accumulated water and to provide lean solvent for the absorption of $SO_2$. This saves much energy that would be required if all of the solvent were stripped. The advantages of the system of the present invention may be further explained as follows:

Benefits of Chemical Regeneration of Process Solvent

An important feature of this invention is the regeneration of the process solvent by chemical reaction. As is well known to those skilled in the art, the physical solubility characteristics of $H_2S$ in the solvent which increases with increasing pressure but decreases with increasing temperature determine the flow of solvent that is required relative to the flow of the gas stream in the primary absorption step. The flow of solvent is essentially independent of the concentration of $H_2S$ in the sour gas fed to the primary absorber, i.e., the same solvent flow is required when the feed contains 2% $H_2S$ as when it contains only 0.2% $H_2S$. Chemical regeneration of the solvent is thus particularly advantageous when the gas being treated is dilute in $H_2S$ and/or is at a low pressure.

A second important advantage of chemical regeneration of the solvent is realized when it is desired to have very high selective removal of $H_2S$. Since reactor 25 in FIG. 2 operates at very nearly the same pressure as absorber 10, the chemically regenerated solvent remains saturated with the gases of other than $SO_2$ that are in the feed stream. The function of the chemically regenerated solvent that is recycled directly to the absorber 10 thus absorbs no additional gases other than $H_2S$ from the feed stream, and only those other gases that are contained in the fraction of solvent that is sent to stripper 69 and actually removed from the feed gas. As a result this process in the configuration shown in FIG. 2 is highly selective for $H_2S$ relative to other gases and becomes increasingly selective as the concentration of $H_2S$ in the feed gas is reduced.

To effect stringent $H_2S$ removal from the treated gas it is important to reduce the $H_2S$ content of the solvent stream entering the top of the primary absorber equally drastically, to a level that is ascertained from solubility data such as those discussed below. The energy requirement for reducing the $H_2S$ content of the entire solvent stream to this level by conventional stripping is substantial, since the flow of steam required for effective stripping is a set fraction of the liquid flow (just as the solvent flow in the absorber is set by the gas flow there.) Regenerating a fraction of the $H_2S$-rich process solvent leaving the absorber by chemical reaction renders that fraction essentially free of $H_2S$ without passing it through the stripper. Only enough of the solvent stream need flow through the stripper to remove the water formed by Reaction 1 and added in the washing steps. The energy required for stripping can thus be greatly reduced relative to earlier processes.

It will therefore be apparent that a new and advantageous process for removal of $H_2S$ from gases has been provided.

I claim:

1. A process for treating a feed gas containing one or more major components and also containing a minor amount of hydrogen sulfide, said method comprising:
   (a) providing a solvent which has a higher solvent power for sulfur dioxide than for hydrogen sulfide and a higher solvent power for hydrogen sulfide than for carbon dioxide, propane and butane, said solvent being one which is chemically unreactive, with water, sulfur dioxide and other components of the feed gas and with other substances that it contacts during the process,
   and carrying out the following steps continuously:
   (b) contacting the feed gas with the solvent in an absorption zone under conditions to absorb the hydrogen sulfide in the solvent leaving a feed gas substantially free of hydrogen sulfide, and forming a solution of hydrogen sulfide in the solvent,
   (c) withdrawing feed gas free of hydrogen sulfide and also withdrawing said solution from the absorption zone,
   (d) the solution so withdrawn being in the form of a first stream and a second stream which is smaller than the first stream
   (e) mixing the first stream in a first reaction zone with a solution of sulfur dioxide in said solvent in proportions in excess of that required stoichiometrically for reaction (1)

$$2\ H_2S + SO_2 \rightarrow 3\ S + 2\ H_2O \qquad (1)$$

said mixing being carried out in a manner to produce sulfur, water and a solvent phase containing the amount of sulfur dioxide in excess of that required stoichiometrically for reaction (1)
   (f) withdrawing from the first reaction zone sulfur, water, a major stream of said solvent phase, and a minor stream of said solvent phase,
   (g) recycling the major stream of separated solvent phase resulting from step (f) to the absorption zone,
   (h) mixing said second stream in a second reaction zone with the minor stream of solvent phase resulting from step (f) in proportions such that the hydrogen sulfide is in small excess of the amount required stoichiometrically for reaction (1),
   (i) separating from said second reaction zone undissolved gas and a stream of solvent containing hydrogen sulfide and water dissolved therein and also separating sulfur
   (j) subjecting the solvent stream separated in step (i) to stripping action to separate hydrogen sulfide and water from the solvent, and
   (k) recycling the solvent resulting from step (j) to the absorption zone.

2. The process of claim 1 wherein the gas separated from the second reaction zone is (1) compressed and recycled to the absorption zone or (2) is introduced into a furnace to convert hydrogen sulfide to sulfur dioxide and water or (3) a portion of such gas is so recycled and another portion is so introduced into a furnace.

3. The process of claim 1 wherein the gas phase separated in step (j) is cooled to condense water, the condensate of water is subjected to stripping to remove hydrogen sulfide and to produce water free of hydrogen sulfide.

4. The process of claim 3 wherein the hydrogen sulfide free water is used in the process.

5. The process of claim 1 wherein a sufficient quantity of the sulfur that is produced is burned with air in a furnace to provide the sulfur dioxide used in the process.

6. The process of claim 5 wherein the sulfur dioxide produced by the furnace is absorbed by the solvent in a sulfur dioxide scrubber and is used in the process to carry out reaction (1).

7. A process for treating a feed gas containing one or more major components and also containing a minor amount of hydrogen sulfide and a minor amount of another gas which it is desired to separate from the feed gas and to recover, said method comprising:
   (a) providing a solvent which has a higher solvent powder for sulfur dioxide that for hydrogen sulfide and a higher solvent power for hydrogen sulfide than for said major component or components and for said other gas, said solvent being one which is chemically unreactive with hydrogen sulfide, sulfur dioxide and other components of the feed gas and with other substances that it contacts during the process,
   and carrying out the following steps continuously:
   (b) contacting the feed gas with the solvent in an absorption zone under conditions to absorb the hydrogen sulfide and said other gas in the solvent leaving a feed gas substantially free of hydrogen sulfide, and forming a solution of hydrogen sulfide and said other gas in the solvent,
   (c) withdrawing feed gas free of hydrogen sulfide and also withdrawing said solution from the absorption zone,
   (d) the solution so withdrawn being in the form of a first stream and a second stream which is smaller than the first stream,
   (e) mixing the first stream in a first reaction zone with a solution of sulfur dioxide in said solvent in proportions in small excess of that requires stiochiometrically for reaction (1)

$$2\ H_2S + SO_2 \rightarrow 3\ S + 2\ H_2O \qquad (1)$$

said mixing being carried out in a manner to produce sulfur, water and a solvent phase containing sulfur dioxide in excess of that required stoichiometrically for reaction (1) and containing said other gas,
   (f) flashing said other gas from solution and removing it from the first reaction zone,
   (g) removing from the first reaction zone the sulfur, water and solvent phase resulting from step (e) and introducing it into a flashing zone at a pressure less than that in the first reaction zone, thereby flashing a further quantity of said other gas,
   (h) removing the gas resulting from step (g) from said flashing zone and also removing water, sulfur and solvent phase from said flashing zone,
   (i) mixing the solvent phase so removed with said second stream in proportions in small excess of that required stoichiometrically for reaction (1) and causing reaction (1) to occur in a second reaction zone,
   (j) venting gas from said second reaction zone and also removing a solvent phase from said second reaction zone and also removing sulfur from said second reaction zone,
   (k) stripping gas including any unreacted sulfur dioxide and unreacted hydrogen sulfide from the separated solvent resulting from step (j) and (l) recycling the resulting solvent to said absorption zone.

8. The process of claim 7 in which the feed gas contains hydrogen and carbon dioxide and in which the solution removed from the absorption zone in step (c) is flashed to remove hydrogen which is returned to the absorption zone.

9. The process of claim 7 in which said other gas is carbon dioxide which is removed in steps (f) and (g) and the two streams of carbon dioxide are combined and are washed with water and solvent to remove sulfur dioxide.

* * * * *